US009179000B2

(12) United States Patent
Kolodizner et al.

(10) Patent No.: US 9,179,000 B2
(45) Date of Patent: Nov. 3, 2015

(54) METHOD AND APPARATUS FOR FAIL-SAFE CONTROL OF RECORDINGS

(71) Applicant: NICE-SYSTEMS LTD, Ra'anana (IL)

(72) Inventors: Efim Kolodizner, Ashdod (IL); Shay Levy, Raanana (IL); Tal Zur, Rishon-Lezion (IL)

(73) Assignee: NICE-SYSTEMS LTD, Ra'anana (IL)

( * ) Notice: Subject to any disclaimer, the term of this patent is extended or adjusted under 35 U.S.C. 154(b) by 282 days.

(21) Appl. No.: 13/802,839

(22) Filed: Mar. 14, 2013

(65) Prior Publication Data

US 2014/0270118 A1 Sep. 18, 2014

(51) Int. Cl.
*H04M 1/64* (2006.01)
*H04M 3/53* (2006.01)
*H04M 3/42* (2006.01)
*H04M 7/00* (2006.01)

(52) U.S. Cl.
CPC ............ *H04M 3/53* (2013.01); *H04M 3/42221* (2013.01); *H04M 7/0012* (2013.01); *H04M 3/42314* (2013.01); *H04M 7/0078* (2013.01); *H04M 2203/558* (2013.01)

(58) Field of Classification Search
CPC . H04L 65/105; H04L 65/605; H04M 3/2236; H04M 3/42221; H04M 3/5191; H04M 7/006

USPC ..................... 379/88.01–88.19; 707/640–660
See application file for complete search history.

(56) References Cited

U.S. PATENT DOCUMENTS

| | | | |
|---|---|---|---|
| 2008/0260116 A1* | 10/2008 | Didcock ..................... | 379/88.18 |
| 2008/0298253 A1* | 12/2008 | Walker et al. ................. | 370/241 |
| 2009/0290687 A1* | 11/2009 | Williams et al. ........... | 379/32.01 |
| 2010/0158204 A1* | 6/2010 | Diskin et al. ................... | 379/85 |
| 2010/0316199 A1* | 12/2010 | Martin, II .................. | 379/88.08 |
| 2013/0315382 A1 | 11/2013 | Liberman et al. | |

* cited by examiner

*Primary Examiner* — Solomon Bezuayehu
(74) *Attorney, Agent, or Firm* — Soroker-Agmon

(57) ABSTRACT

A method for fault-tolerant recording of calls of a PBX, comprising
concurrently receiving metadata of calls of a PBX by a plurality of computerized apparatuses, generating unique identifiers for each of the calls such the unique identifiers that are common between the plurality of the computerized apparatuses, activating a first computerized apparatus to control recordings of contents of the calls and assigning the recording with the unique identifiers respective to the calls, operating the computerized apparatuses to receive feedbacks of activities of the recordings, where the feedbacks comprise the assigned unique identifiers and in case of a failure of the first computerized apparatus, activating a second computerized apparatus to maintain the recordings that were controlled by the first computerized apparatus.

13 Claims, 7 Drawing Sheets

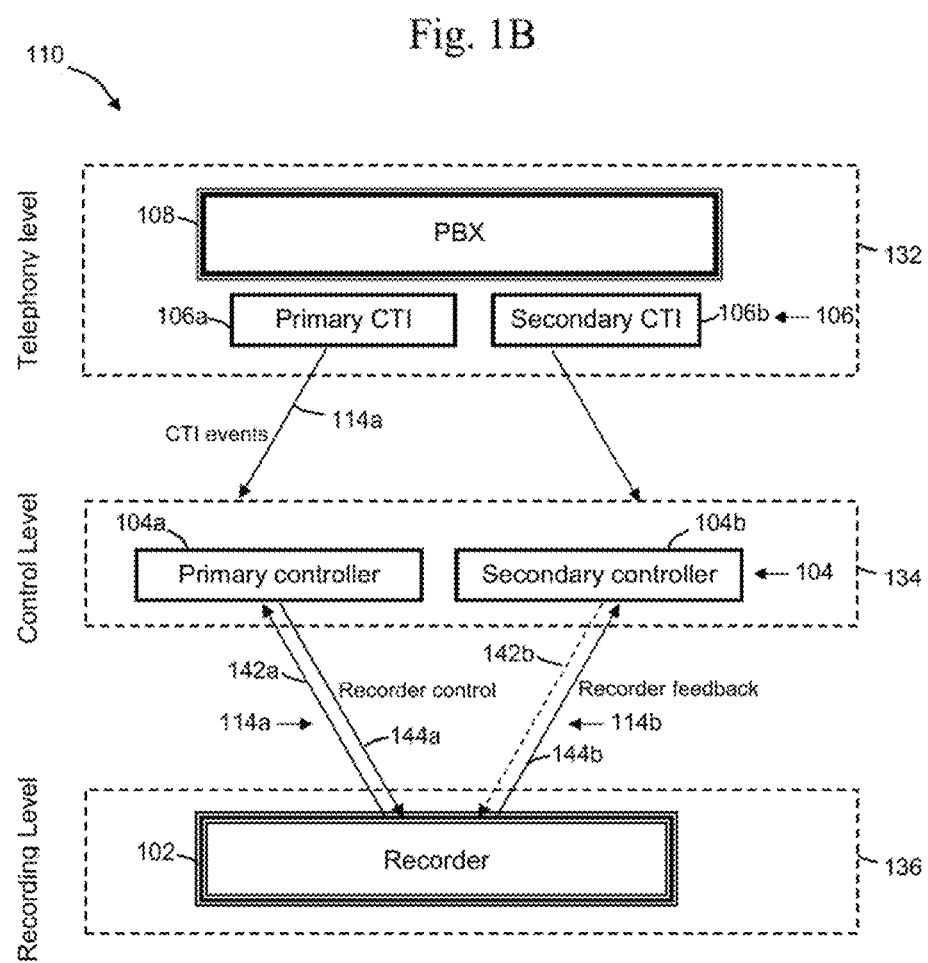

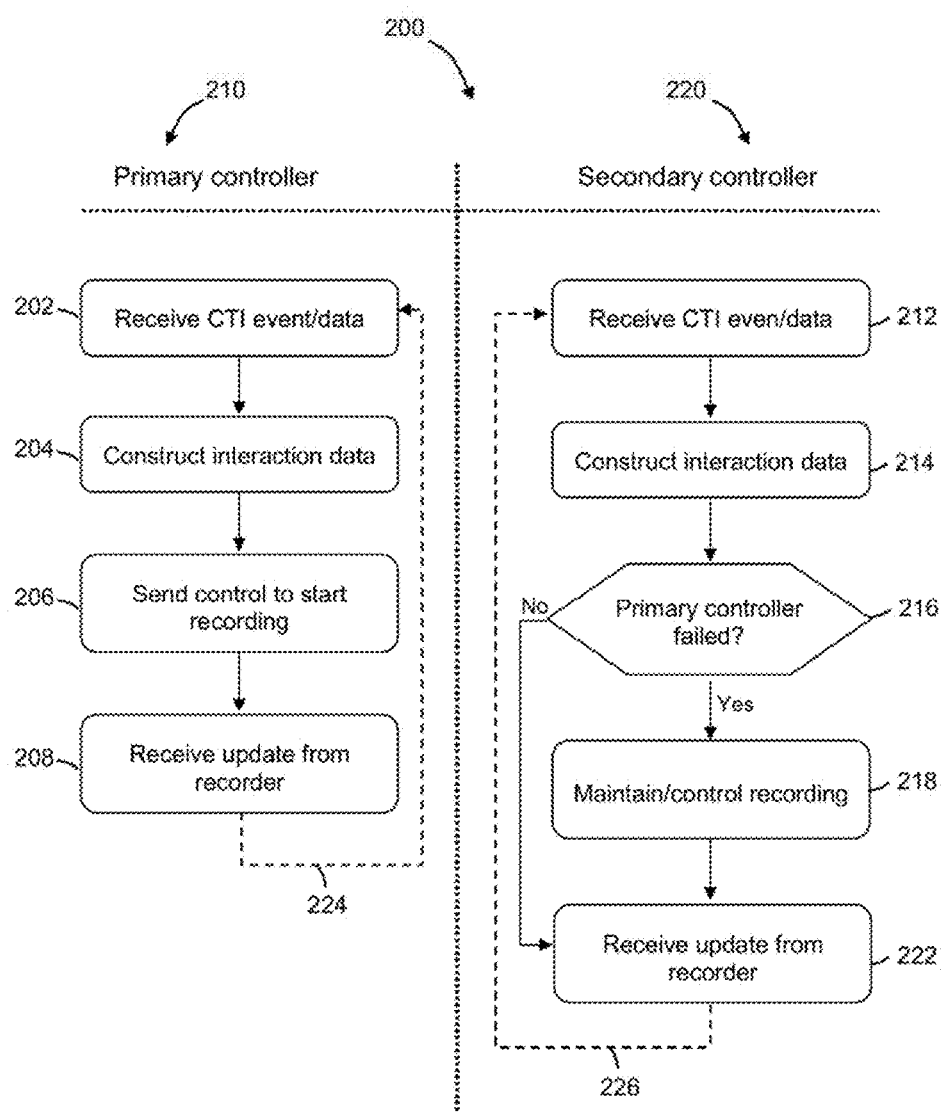

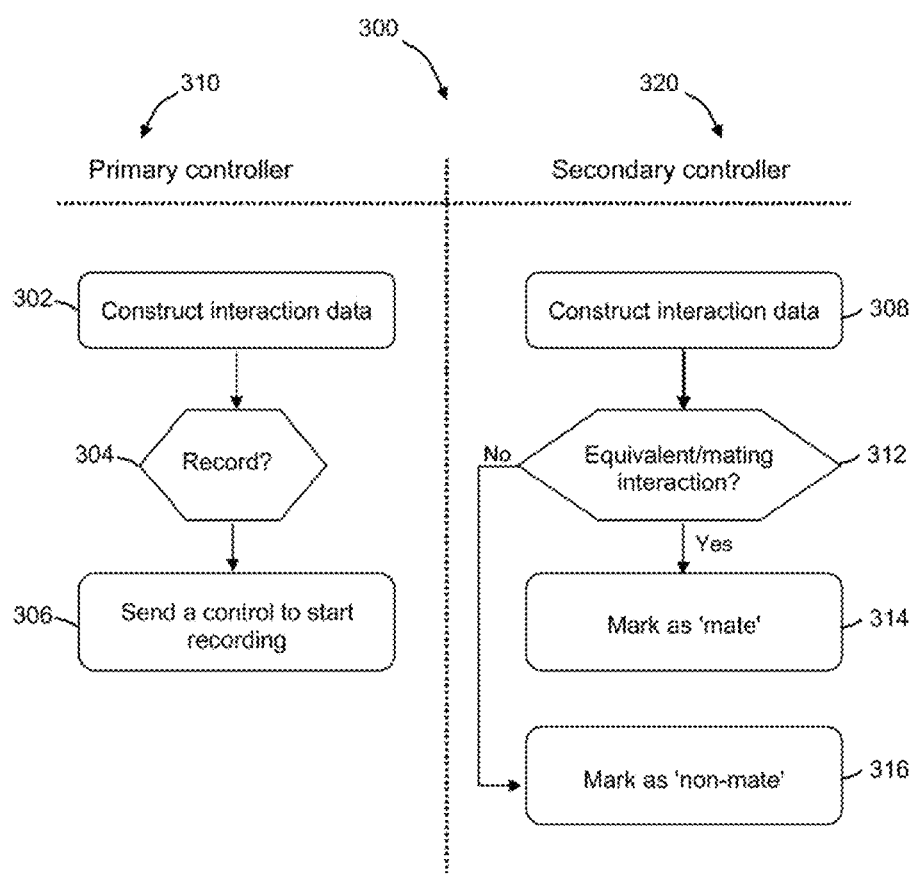

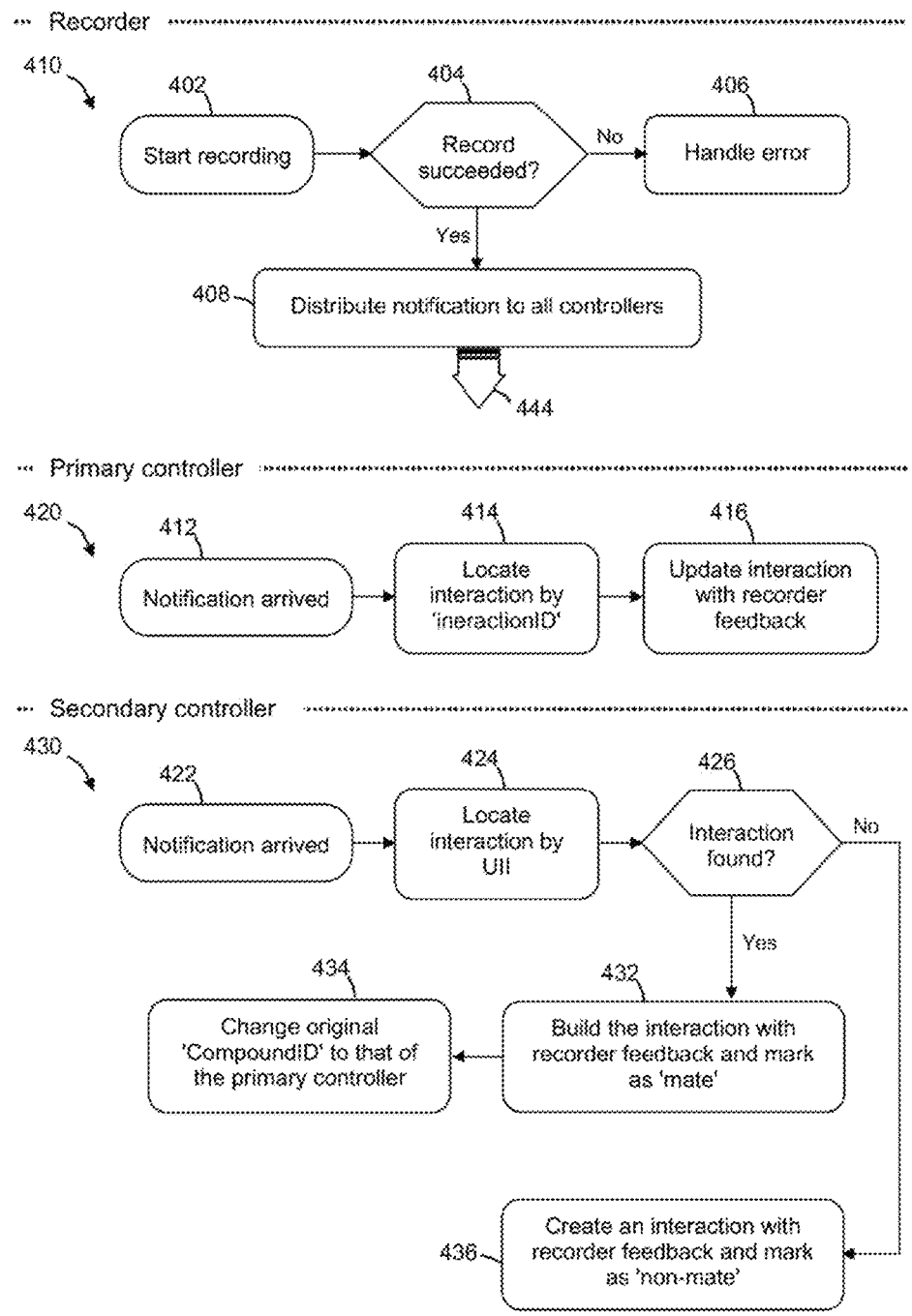

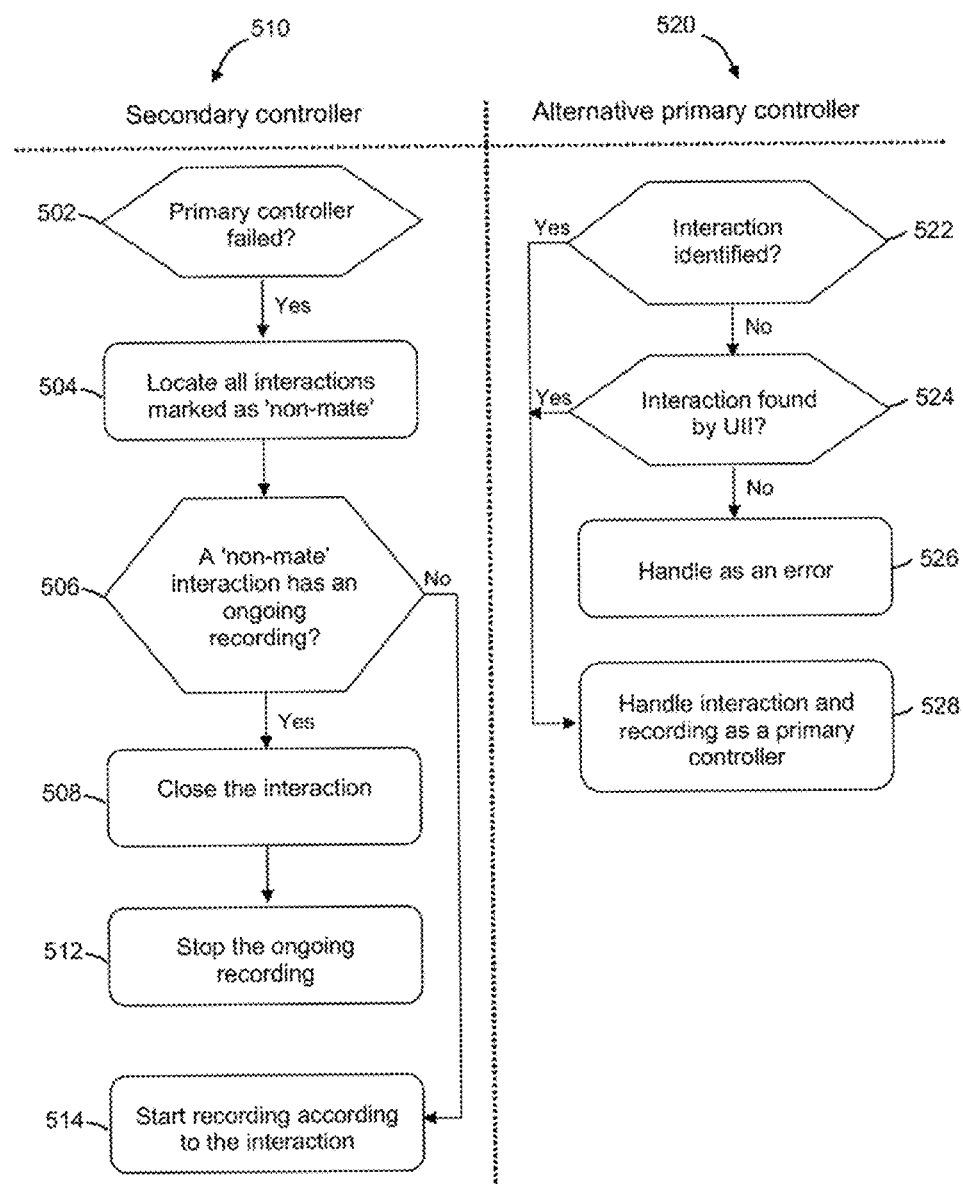

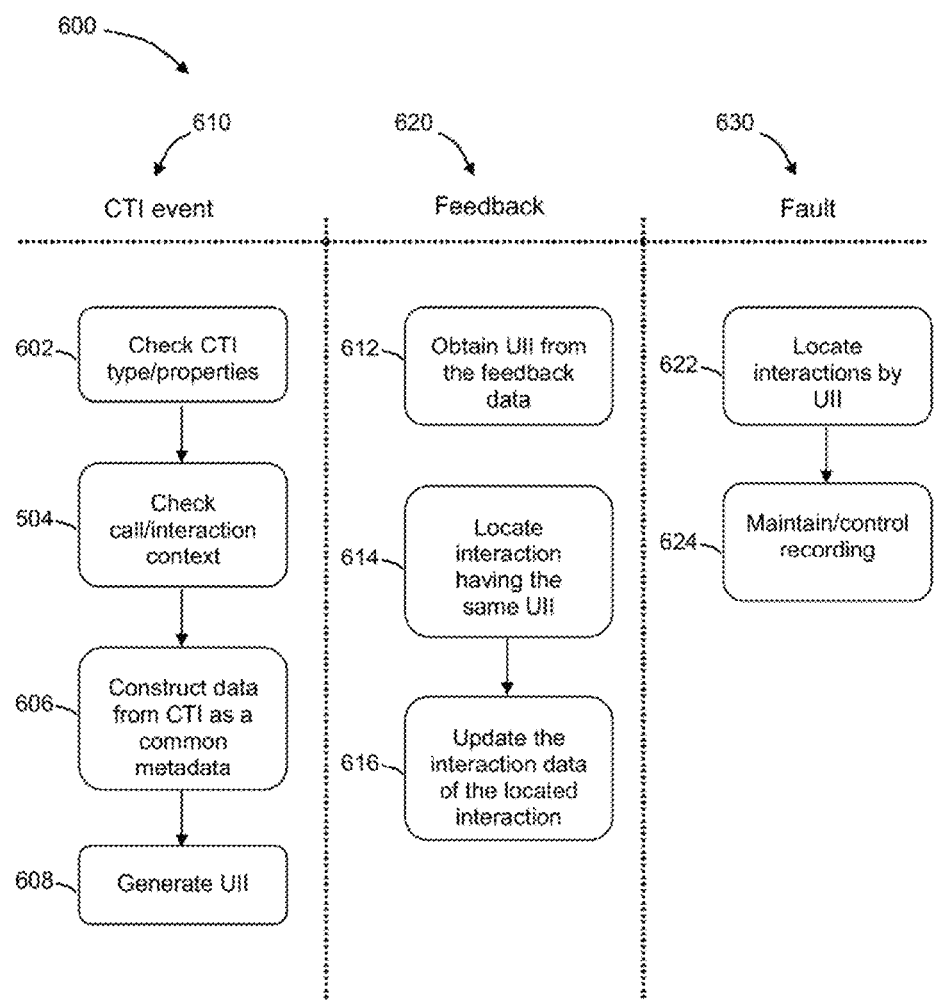

METHOD AND APPARATUS FOR FAIL-SAFE CONTROL OF RECORDINGS

BACKGROUND

The present disclosure generally relates to control of recording of any type of interactions, and more specifically to fault-tolerant recording of calls.

Fault-tolerant storage techniques are known in the art, where redundant or multiple-parallel recordings are used to avoid loss of data in case of a failure that affect the control and recording. For example, using RAID (Redundant Array of Independent Disks) to equipment.

Contemporary systems for recording telephonic calls using redundant storage are commonplace, such as ZOOM CallREC (ZOOM International s.r.o., Czech Republic), Impact 360 (Verint Systems Inc.) or Oreka (OrecX LLC).

SUMMARY

One exemplary embodiment of the disclosed subject matter is a method for fault-tolerant recording of calls of a PBX, comprising operations of:

concurrently receiving metadata of calls of a PBX by a plurality of computerized apparatuses.

based on the metadata, generating by the plurality of computerized apparatuses unique identifiers for each of the calls such the unique identifiers that are common between the plurality of the computerized apparatuses.

activating a first computerized apparatus of the plurality of computerized to apparatuses to control recordings of contents of the calls based on the metadata received by the first computerized apparatus while assigning the recording with the unique identifiers respective to the calls.

operating the plurality of the computerized apparatuses to receive feedbacks of activities of the recordings, where the feedbacks comprise the assigned unique identifiers respective to the calls so that the plurality of the computerized apparatuses are updated with activities of recordings of identifiable calls.

and in case of a failure of the first computerized apparatus, activating a second computerized apparatus of the plurality of computerized apparatuses to maintain, according to the unique identifiers comprised in the feedbacks of activities of the recording, the recordings that were controlled by the first computerized apparatus, thereby sustaining the recordings regardless of the failure of the first computerized apparatus.

Another exemplary embodiment of the disclosed subject matter is a system for fault-tolerant recording of calls of a PBX, comprising elements as:

a PBX.

a plurality of CTI apparatuses connected to the PBX for supplying metadata of calls of the PBX.

a plurality of computerized apparatuses corresponding to the plurality of the CTI apparatuses where each of the computerized apparatuses is connected to one of the CTI apparatuses for receiving the metadata of the calls and configured to generate unique identifiers of the calls that are common between the plurality of the computerized apparatuses.

a recorder device connected to the PBX by a data link for receiving contents of the calls, and further connected to the plurality of the computerized apparatuses.

The system is configured such that when the contents of the calls of the PBX is transferred to the recorder device, correspondingly the plurality of the CTI apparatuses supply metadata of the calls to the plurality of the plurality of the computerized apparatuses connected thereto.

The system is further configured such that a first computerized apparatus of the plurality of the computerized apparatuses controls recording of the contents of the calls by the recorder device while assigning the unique identifiers of the calls to the recorder device, wherein the recorder device is configured to provide feedback of activities thereof to the plurality of the computerized apparatuses, wherein the feedback comprises the assigned unique identifiers of the calls.

The system is operable such that in case the first computerized apparatus of the plurality of the computerized apparatuses fails, a second computerized apparatus of the plurality of the computerized apparatuses is activable to maintain, based on the supplied metadata and the feedback from the recorder device that comprises the assigned unique identifiers of the calls, recordings of the calls that were controlled by the first computerized apparatus, thereby sustaining recordings of the recorder device regardless of a failure of the first computerized apparatus.

In some embodiments, the system further comprises a data storage for at least one or both of sharing metadata of the plurality of the computerized apparatuses or for storing the contents of the calls.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, with an additional letter or letters to distinguish between similar entities or variants of entities, and may not be repeatedly labeled and/or described.

Figure 1A:
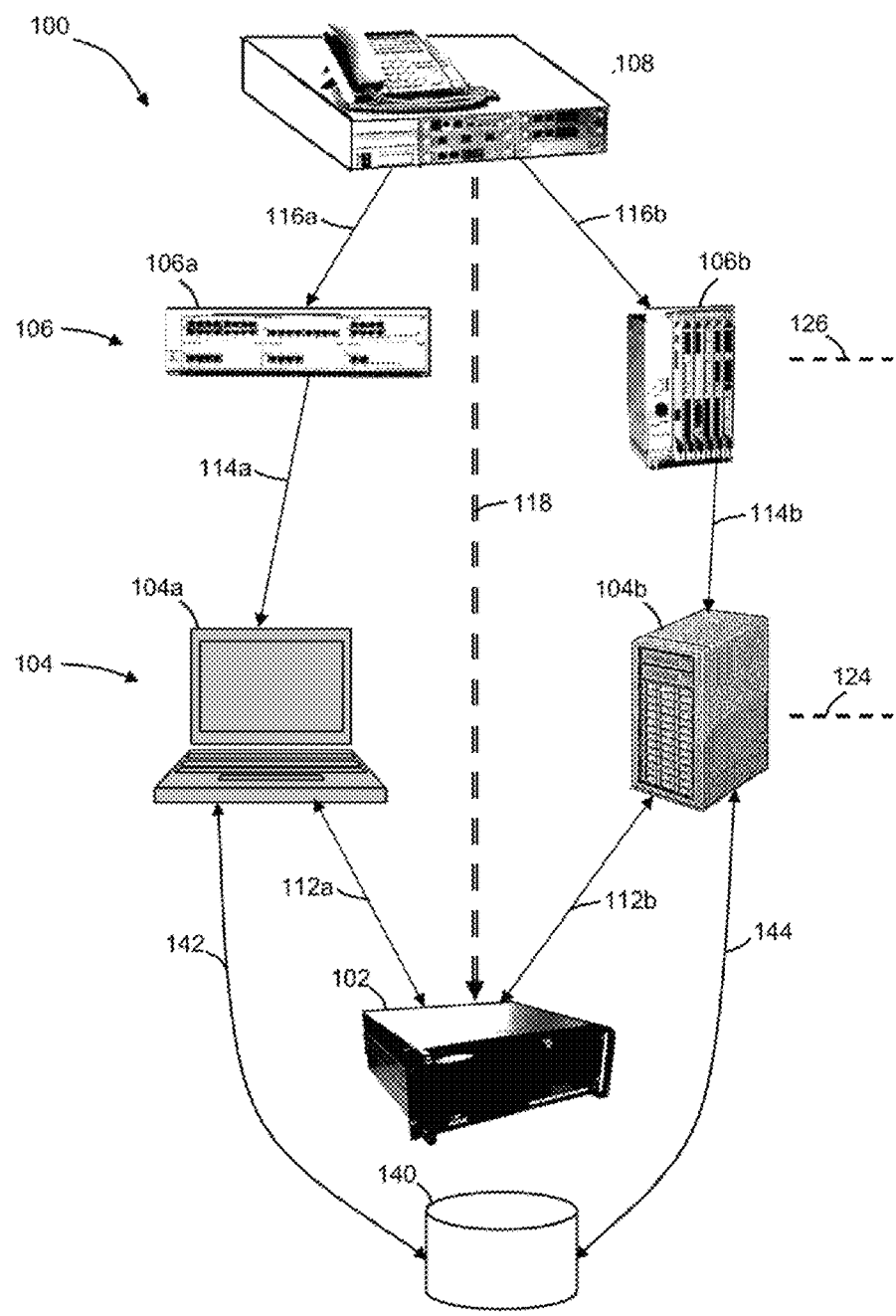

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

FIG. 1A schematically illustrates apparatuses and some interconnections therebetween for fail-safe recording of calls, according to exemplary embodiments of the disclosed subject matter;

FIG. 1B schematically illustrates a hierarchical architecture of components and some data transfers therebetween for fail-safe recording of calls, according to exemplary embodiments of the disclosed subject matter;

FIG. 2 outlines operations for fail-safe operation, according to exemplary embodiments of the disclosed subject matter;

FIG. 3 outlines operations for initiating a recording for fail-safe operation, according to exemplary embodiments of the disclosed subject matter;

FIG. 4 outlines operations outlines operations related to the distribution of notifications from the recorder, according to exemplary embodiments of the disclosed subject matter, according to exemplary embodiments of the disclosed subject matter;

FIG. 5 outlines operations for handling fault for fail-safe operation, according to exemplary embodiments of the disclosed subject matter; and FIG. 6 outlines operations for handling fault for fail-safe operation, according to exemplary embodiments of the disclosed subject matter.

DETAILED DESCRIPTION

In the context of the present disclosure, without limiting, the terms 'fail', 'failure' or 'fault' imply a failure in the operation of an apparatus that does not enable proper operation thereof.

In the context of the present disclosure, without limiting, when related to an apparatus the terms 'fail-safe' or 'fault-tolerant' denote a functionality that is not affected or sufficiently negligibly affected in case of a failure in or of a component of the apparatus.

In the context of the present disclosure, without limiting, term 'telephonic' relates to data transfers between two or more devices. The data may be of any form, such as voice, image or video or any other medium, transferable over any type or combination of communication facilities, such as PSTN (Public Switched Telephone Network), computer networks, Internet or wireless communications.

In the context the present disclosure, without limiting, the term 'PBX' (Private Branch Exchange) denotes any instrument or apparatus that provides a telephonic access and switching and/or routing.

In the context of the present disclosure, without limiting, the terms 'audio' and/or 'media' denote and/or relate to contents of a telephonic call such as voice or fax or video, in any form such as an analog signal or a digitally encoded stream or a combination thereof.

In the context of some embodiments of the present disclosure, without limiting, the term 'call' denotes a telephonic call of and/or in and/or through a PBX.

In the context of the present disclosure, without limiting, the term 'recording' denotes storing of audio data on any device in any format and/or organization.

As used in the context of the present disclosure, without limiting, the term 'metadata' or elements thereof denote data and/or information about a call of and/or in and/or through a PBX.

In the context of the present disclosure, without limiting and unless clearly otherwise evident, the term 'interaction' denotes operations or actions taken in and/or for and/or involved in recording a call.

In the context of the present disclosure, without limiting, the term 'interaction data' denotes metadata of a call of and/or in and/or through a PBX as well as data of and/or related to the course and operation of a recording of the call.

For brevity, unless otherwise evident from the usage context, the term 'interaction' is also used to refer to the interaction data, where the interaction data represents the interaction. For example, creating an interaction, locating an interaction or storing an interaction implies, respectively, creating, locating or storing interaction data of a call.

In the context of the present disclosure, without limiting, the term 'dataset' denotes a collection and/or a group and/or assembly of interaction data. According to the context, a dataset implies also content thereof, that is, the interaction data or elements thereof.

In the context of the present disclosure the term CTI apparatus (Computer Telephony Integration apparatus) is as known in the art, for example products of Avaya (Avaya Inc.), Cisco (Cisco Systems, Inc.), Alcatel (ALCATEL-LUCENT S.A.) or Genesys (Genesys Telecommunications Laboratories). Yet, without limiting, a CTI apparatus denotes any data processing device, such as a computer, having hardware components for communicating and/or intercommunicating with a PBX. The communication and/or intercommunication generally comprise operations such as call answering, call forwarding or a conference call, as well as acquiring metadata of a call. A CTI apparatus is also referred to as CTI server, and for brevity, a CTI apparatus is also referred to as 'CTI'.

In some embodiments, the CTI apparatus supplies metadata in a particular format and/or by a particular protocol and/or interaction, likely or possibly different from another CTI apparatus. In some embodiments, according to the apparatuses used the CTI transfers also audio from the PBX.

As used herein, the term 'parallel' or 'concurrent' with respect to operations implies one or more operations operative in a practically and/or sufficient concurrent manner, yet not necessarily simultaneously.

The terms cited above denote also inflections and conjugates thereof.

One technical problem dealt by the disclosed subject matter is a fail-safe recording of calls at a PBX while avoiding redundant recordings of the calls.

Another technical problem dealt by the disclosed subject matter is correlating metadata of a call where the metadata is received from CTI apparatuses that provide metadata in different formats and/or contents.

One technical solution according to the disclosed subject matter comprises a plurality of CTI apparatuses, each interacting with the PBX to supply metadata about the calls received at a PBX. Elements of the metadata, obtained from each of the plurality of CTI apparatuses that are suitable and sufficient for controlling a recording of calls received at a PBX are identified and separately retained in datasets of data respective to each of the plurality of CTI apparatuses. The datasets also comprises update or feedback data of activities of the recording and/or tracking thereof, so that a dataset comprises interaction data respective to a call and the course of the recording.

One dataset is operative at a time for controlling the recording of calls received at a PBX, and one or more datasets are maintained as backup of the interaction and recording course and operations. In case the operating dataset is determined as out of order, another dataset as a backup is activated to operate instead, thereby sustaining the recording of the calls in a fault-tolerant manner.

Thus, only the interaction data is redundantly maintained, rather than redundancy of the audio of the calls, the latter generally having a much larger amount of data relative to the metadata and requiring much larger storage and/or more complex equipment for redundant recording relative to maintaining or storing of redundant interaction data.

Another technical solution according to the disclosed subject matter comprises data processing equipment, configured with suitable executable logic, for determining and forming different elements of metadata respective to each of the plurality of CTI apparatuses into similar and/or equivalent and/or analogous and/or related datasets.

In some embodiments, a data element that commonly and uniquely identifies each and both of datasets and/or interaction data respective to a call is constructed or generated, the data element also referred to as a unique Interaction Identifier or UII. Thus, using the UII, interaction data can be conveniently correlated or associated between the datasets and/or interaction data respective to a call.

A potential technical effect of the disclosed subject matter is a sufficiently rapid recovery of recording of calls received at a PBX without a detrimental consequence, or only a sufficiently negligible consequence, on a recording of calls received at a PBX while avoiding redundant recordings of the received calls.

A general non-limiting presentation of practicing the present disclosure is given below, outlining exemplary practice of embodiments of the present disclosure and providing a constructive basis for variant and/or alternative and/or divergent embodiments, some of which are subsequently described.

FIG. 1A schematically illustrates a system 100 of apparatuses and some interconnections therebetween for fail-safe recording of calls, according to exemplary embodiments of the disclosed subject matter.

A PBX 108 is connected to a plurality of CTI's, where any CTI is referred to as CTI 106, exemplified as a CTI 106a and a CTI 106b, representing any number of at least two of CTI 106 as indicated by a dashed line 126. The CTI's, or part thereof, may be different from one another as shown figuratively for CTI 106a and a CTI 106b.

PBX 108 is connected to each of CTI 106, as indicated by an arrow 116a and an arrow 116 that connect PBX 108 to CTI 106a and CTI 106b, respectively, for data transfer from PBX 108 to each of CTI 106.

Each CTI 106 is connected to one of a plurality of recording controllers, where any recording controller is referred to as controller 104, exemplified as a controller 104a and a controller 104b, representing any number of at least two of controller 104 corresponding to the plurality of CTI's, as indicated by a dashed line 124 that corresponds to dashed line 126. Thus, as an example, CTI 106a is connected to controller 104a as indicated by an arrow 114a and CTI 106b is connected to controller 104b as indicated by an arrow 114b for data transfer from each of CTI 106 to each of controller 104. For brevity, a recording controller is also referred to as a controller.

Each controller 104 is connected to a recorder 102, as indicated by a double-arrow 112a that connects controller 104a to recorder 102 for data transfer therebetween, and a double-arrow 112b that connects controller 104b to recorder 102 for data transfer therebetween.

In some embodiments, each of controller 104 is connected to a data storage device or devices, denoted as storage 140, such a database, as indicated by an arrow 142 and an arrow 144. Each of controller 104 is operative with storage 140, for example, data of and/or related to interactions are stored in and retrieved from storage 140.

Generally, in some embodiments, controller 104 is a computerized apparatus having components for interacting with CTI 106 and recorder 102, such as for data transfer from CTI 106 and to recorder 102.

Generally, one route, such as denoted by sequence of arrows 116a-114a-112a is operative at time, referred to as a primary path with controller 104a referred to as a primary controller.

In case a failure occurs in the primary route, such as a failure in controller 104a, an alternative path, such as denoted by sequence of arrows 116b-114b-112b, becomes operative, continuing the recording of the calls of PBX 108 without interruption or with sufficiently negligible interruption. The alternative route is denoted as a secondary route with controller 104 denoted as a secondary controller.

Once the secondary controller with the corresponding secondary route become operative, secondary controller with the secondary route may be referred to as a primary controller and primary route, respectively.

It is noted that a plurality of secondary routes and corresponding secondary controllers may be present in system 100, though only one route and a corresponding controller as a primary controller are active and operative in recording at a time.

Thus, generally, one of controller 104 is active in controlling a recorder, wherein the other controllers are used as backup in case the active controller fails.

Recorder 102 is a device, optionally a computerized device, constructed and/or configured to record the audio, optionally under the control of controller 104. In some embodiments, recorder 102 converts the audio to a digital format and stores the digitized audio, optionally after some processing, on storage 140. Optionally or alternatively, recorder 102 stores the audio in an analog format on a storage medium such as storage 140, optionally after some processing. The recorder is also referred to a recorder device or a recording device.

Generally, in some embodiments, recorder 102 comprises a plurality of recording components at least optionally operating and/or operable in parallel. Each of the components is controlled and/or controllable by a corresponding controller, where, generally, an active controller such as a primary controller controls one of the components. Thus, upon failure of the active controller, such as the primary controller, the component of recorder 102 that was controlled by the failing controller becomes inoperative, and a backup controller, such as the secondary controller, takes and/or resumes control of the component of recorder 102 that corresponds to the backup controller.

Audio of calls from PBX 108 are transferred to recorder 102 by any suitable technique and/or channel, such as a data link between PBX 108 and recorder 102, as shown schematically and/or virtually by an arrow 118. In some embodiments, the audio is transferred to recorder 102 directly from PBX 108 such as by an RTP (Real-time Transport Protocol), optionally under the control of one or all of controller 104. Optionally or alternatively, the audio is transferred via CTI 106 and controller 104. Further optionally, in some embodiments, other methods and/or protocols are used to supply audio to recorder 102.

In some embodiments, each CTI 106 is of a different brand and/or operating in different protocols and/or providing data in different formats and/or contents.

In some embodiments, each CTI 106 similarly, each controller 104 is positioned in different locations, optionally remote from a corresponding CTI, for example, controller 104a is remote from CTI 106a.

In some embodiments, recorder 102 is remote from each and/or any controller 104 and/or from any CTI 106 and/or PBX 108.

In some embodiments, some of the elements of system 100 are combined, for example, the PBX may be combined with one or more CTI's, or the recorder may be combined with one or more controllers.

As denoted by double-arrow 112a and double-arrow 112b, recorder 102 updates any one of controller 104 with a feedback the course and/or activities of the recording. The activities of the recording comprise, for example, start of recording, end of recording elapsed time of the recording. In some embodiments, the feedback is initiated by recorder 102, such as by events generated in the recorder. In some embodiments, recorder 102 provides with the feedback data related to the call, such as or based on metadata provided by CTI 106.

FIG. 1B schematically illustrates, analogous to system 100, a hierarchical architecture 110 of components and some data transfers therebetween for fail-safe recording of calls, according to exemplary embodiments of the disclosed subject matter.

A telephony level, denoted also as a telephone level 132, includes PBX 108 and a plurality of CTI's, shown as 'Primary CTI' and 'Secondary CTI' akin to CTI 106a and a CTI 106b of system 100, that interact with PBX 108.

The denotations of a primary and secondary with respect to CTI's are for clarity and consistency with the denotation of the controllers and the subsequent description below, though there is no inherent distinction between the operations of the primary CTI and the secondary CTI. Further, selecting one controller as a primary one that is initially active and a secondary one as a backup controller is a matter of design decision.

A control level, denoted also as control level 134, includes a plurality of controller 104, shown by way of example as a primary controller which is initially operative and a secondary controller that is used as backup in case the primary controller fails to operate properly.

Events such as of calls in PBX 108 are provided from and/or by each of CTI 106 to a corresponding controller 104, as indicated by an arrow 116a and an arrow 116b. That is, the corresponding primary controller as controller 104a, and the secondary CTI as CTI 10612 provides CTI events to the corresponding secondary controller as controller 104b. Together with and/or responsive to the event, metadata of a call is supplied by and/or acquired from the CTI. The CTI events and optional metadata is provided to the controllers, and/or the controllers esquire the metadata from the CTI's, concurrently or at least sufficiently or practically concurrently.

Based on the CTI events, the primary controller sends to recorder 102 control data to operate the recorder to record the audio, as indicated by an arrow 142a.

During the recording, recorder 102 provides to the primary controller and/or the primary controller acquires from recorder 102 feedback on the progress of the recording, as indicated by an arrow 144a. In parallel and similarly, recorder 102 provides to the secondary controller and/or the secondary controller acquires from recorder 102 feedback on the progress of the recording, as indicated by an arrow 144 so that the secondary controller is informed of the progress or course of the recording so if the primary controller becomes inoperative, the secondary controller can substitute the operation of the primary controller, as indicated by a dashed-arrow 142b.

Thus, both the primary controller and the secondary controller maintain redundancy of interaction data for controlling the recorder.

For brevity and clarity, without limiting generality, only primary controller and one secondary controller, such as respectively controller 104a and controller 104b, are referred below.

In order for a secondary controller to substitute a failed primary controller, the interactions thereof should be coordinated and/or correlated so that once a primary controller fails with a disruption of the interaction thereof, then the interaction of the secondary controller can continue and/or catch up with the interaction of the primary controller or equivalently to that effect.

In some embodiments, different vendors and/or protocols of a CTI are used, providing information of a call in different formats and/or contents, so that a plurality of controllers, such as a primary controller and a secondary controller, may receive CTI data in different formats and/or contents.

Exemplary non-limiting samples of call data of CTI's of several vendors are listed in Table-1 below.

TABLE 1

| Avaya | Cisco | Alcatel | Genesys |
|---|---|---|---|
| Call ID | ConnectionCallID | Call ID | UUID (Universal Unique identifier) |
| Device ID | ConnectionDeviceIDType | Device ID | Device ID |
| UCID (universal call ID) | ConnectionDeviceID | | |

In order to overcome the disparity of the CTI metadata and provide metadata or interaction data that is mutual or harmonized among the plurality of controllers, the metadata of the CTI's analyzed to obtain fields or values that are sufficient to at least identify a call and handling thereof such as recording, the mutual or harmonized data referred to also as 'common metadata'.

In some embodiments, determination of a common metadata is based on sufficiently extensive experimentation, learning the behavior and/or recurrence and uniqueness respective to calls of metadata elements as provided and/or in combination and/or modification thereof. Consequently, determining which CTI fields or data elements can be used as provided or in a combination with other elements or modifications thereof.

Optionally or alternatively, in some embodiments, an algorithm is formed or devised to analyze a sufficient extensive corpus of histories and/or reports of telephonic calls to recognize metadata elements and/or a combination of elements that uniquely identify a call or calls.

By way of example, it is assumed that it was determined that a call data or metadata of Avaya shown in Table-1 can be used as common metadata Accordingly, exemplary though not necessarily genuine, common metadata is depicted in Table-2 below.

TABLE 2

| Call ID | 123456783 |
|---|---|
| Device ID | A1B2C3 |
| UCID | 7777CB999 |

In some embodiments, even using the mutual common metadata, correlating or associating interactions of calls between the controllers may involve burdensome or undue computational load that may have detrimental effect on the performance of system 100, especially when numerous calls are concurrently conducted.

Therefore, in some embodiments, to facilitate correlating or associating the interaction between the controllers, a unique identifier for an interaction is formed and/or generated, also referred to as a unique interaction Identifier or UII.

In some embodiments, the UII is formed and/or generated by concatenation and/or otherwise combining the common metadata elements. Accordingly, by way of example, assuming common metadata as in Table-2 above, the UII is formed by concatenation of the data elements contents to yield, for example, a UII as '123456783 A1B2C37777CB999'.

Optionally or alternatively, other methods may be used for forming a UII. For example, constructing for each identified call in each controller a shared unique value such as known in the art for generating globally unique identifier (GUID) or a universally unique identifier (UUID) as used, for instance, in determining MAC (Media Access Control) addresses. Further optionally, the primary controller may generate the unique value and supply it to the recorder as part of data provided to the controller, and when a feedback is sent to the secondary controller the unique value is provided to the secondary controller with optional other data that identify the interaction such as field of the common metadata.

It is noted that, based on the common metadata of the controller, for each interaction of a call the same UII is generated.

In some embodiments, the UII is incorporated or otherwise associated with the interaction data of calls in all the controllers, so that an interaction of a call can be identified by the UII among a plurality of interactions data respective to a plurality of telephonic calls. For example, upon activating a recording the UII, possibly with other data, is assigned and/or provided to the recorder, so that when a feedback is received at a controller from the recorder while recording audio of a call, employing the UII received in a feedback from the recorder the interaction data respective to the call can be rapidly and distinctively located among the possibly plurality of numerous interaction data of a plurality of numerous calls.

Exemplary non-limiting extended structure of common metadata according to the disclosed subject matter is depicted in Table-3 below, where some of the elements are not necessarily shared between the controllers. The elements are structured based on the C programming language.

TABLE 3

| | |
|---|---|
| Long | InteractionID |
| String | UII |
| Long | CallID |
| String | DeviceID |
| String | UCID |
| Int | DeviceIDType |
| Long | CallReferenceID |
| String | UUID |
| Int | CallDirection |
| Bool | MateFound |
| [ ] | Recordings |

In some embodiments, other elements may be part of the interaction data and/or metadata derived from the interaction data and/or a CTI data, as exemplified, without limiting, below.

An 'InteractionID' which is assigned by the controllers responsive to interception of a call and/or acquiring data of a call from a CTI. The 'InteractionID' identifies a call and/or interaction as a keyword, yet each controller assigns the value of 'InteractionID' independently of each other and, thus, 'InteractionID' is or maybe different between the controllers.

A 'CompoundID' refers to or identifies a call with respect to several parties, such as in a conference call, which involves several interactions, where each interaction having 'InteractionID' that identifies the interaction.

For example, a first party makes a call as a first interaction, a second party which receives the call puts the first party on hold and consults with a third party as a second interaction, and subsequently the second party transfers the call to another party as a fourth party with a third interaction. Thus, each of the three interactions has different InteractionID but the same CompoundID which represents the original call of the first party and the branching thereof.

As the 'InteractionID' and the 'CompoundID' are and/or may be employed to identify interactions of each of the controllers, but are generally different between the controllers, the UII described above serves to correlate interactions of different controllers as a common identifier for interaction of a particular call.

FIG. 2 exemplifies an outline 200 of operations for fail-safe recording operation, according to exemplary embodiments of the disclosed subject matter.

Outline 200 is divided to two parallel sets of operations, a set 210 for a primary controller and a set 220 for a secondary controller that operate responsive to CTI events is from corresponding CTI's, exemplified by the primary CTI and the secondary CTI, respectively.

In operation 202 the primary controller receives CTI event and/or events, together with additional data regarding a call in the PBX such as metadata of the call.

In operation 204, based on the CTI event and/or metadata acquired from the CTI interaction data are constructed to recording and tracking a call. The metadata is constructed to form common metadata such as exemplified in Table-3 above, including constructing and incorporating a UII based on the common metadata.

In operation 206 a recording control is sent to the recorder to record the audio, such as a 'start' command. Optionally, the recorder is supplied and/or assigned with metadata of the call, where the metadata of the call comprises the UII.

In operation 208 updates or feedback data is received from the recorder about the progress and/or course of the recording, thereby updating the interaction data of the primary controller. For example, whether the recording of the call has finished or the ongoing time of the recording. In case of an event of stopping a recording, such as an event indicating end of a call, the primary controller stops the recording and updates the interaction data accordingly.

In operation 212 the secondary controller receives CTI event and/or events, optionally with additional metadata regarding a call in the PBX.

In operation 214, based on the event and/or data thereof interaction data are constructed, the contents of the interaction data of the secondary controller is constructed as similar and/or equivalent and/or analogous to the interaction data of the primary controller. The metadata is constructed to form common metadata, such as exemplified in Table-3 above, including constructing and incorporating a UII based on the common metadata.

In operation 216 the secondary controller checks or is notified, such as by an event or a message, whether the primary controller has fails and/or does not operate properly. If false, control is transferred to operation 222 described below.

If true, in operation 218, according to the course of the recording, the secondary controller maintains and/or controls the recording based on interaction data located and/or identified by the UII provided in feedback of the recorder. Thus, the secondary controller takes the role of a primary controller, and resumes and/or reinitiates the activities of the primary controller. For example, regardless of the failure of the primary controller, ongoing recording is continued and/or sustained by restarting the recording with no effect or sufficiently negligible effect on the recording.

In operation 222 updates or feedback data is received from the recorder about the progress and/or course of the recording, thereby updating the interaction data of the secondary controller.

In some embodiments, updates or feedback from the recorder comprises metadata or elements of the interaction data of the primary controller as supplied by the primary controller, so that the interaction of the secondary controller may or does synchronize the interaction data of the secondary controller with that of the primary controller, thereby maintaining identical and/or similar and/or equivalent interaction data to that of the primary controller. Having synchronized metadata with the primary controller, the secondary controller is outfitted for substituting the operation of a faulted primary controller.

The operations of the primary controller and the secondary controller are carried out in parallel and repeatedly as indicated by an arrow 224 and an arrow 226 respectively. The repeated operations may be due to continuous operation as by a loop and/or based on events such as CTI events and/or events or updates from the recorder.

It is noted that, at least in some embodiments, superfluous operations are avoided. For example, interaction data is not constructed again in case the interaction data is already constructed (e.g. operation 204 and operation 214), or the recorder is not started again if the recorder is operating (e.g. operation 206 and operation 218).

It is noted that the CTI events and/or data with respect to the primary controller and the secondary controller are not necessarily identical.

It is also noted that no redundant or duplicates or the audio are recorded, and only the interaction data is redundantly and/or similarly retained or maintained.

It is also noted that numerous calls may be carried out in or over the PBX and, thus, numerous datasets of interaction data are maintained and handled by the controllers, whereas, in some embodiments, when a call is over the interaction data for the ended call is closed and/or discarded from the controllers.

In some embodiments, ongoing and/or past interaction and/or audio thereof are stored such as in a database for possible later reference and/or playback. In some embodiments, a storage as a database is used to store and retrieve interaction data and/or related information to aid in the cooperation of the primary controller and the secondary controller.

FIG. 3 exemplifies an outline 300 of operations for initiating a recording for fail-safe operation, according to exemplary embodiments of the disclosed subject matter, providing some elaboration with respect to outline 200.

Outline 300 is divided to two parallel sets of operations, a set 310 for a primary controller and a set 320 for a secondary controller that operate responsive to CTI events from corresponding CTI's, exemplified by the primary CTI and the secondary CTI, respectively.

Upon receiving CTI event from the primary CTI, and based on the event and/or data thereof operations of set 310 with respect to a primary controller begin.

In operation 302 interaction data are constructed, such as of common metadata construct, where, based on the common metadata a UII is formed and incorporated in the interaction data and/or the common metadata.

In operation 304, the interaction data is checked whether a recording operation is required. If true, in operation 306 a recording control is sent to the recorder to record the audio, such as a 'start' command, optionally accompanied with and/or as a data structure. The audio may be a streaming data or otherwise provided as discussed above.

Exemplary non-limiting structure of a recording request is illustrated in Table-4 below, where the elements are structured based on the C programming language.

TABLE 4

| | |
|---|---|
| Long | InteractionID |
| Long | CompoundID |
| String | UII |
| Int | ParticipantID |
| DateTime | CommandTime |
| Int | InitiatorTypeID |

TABLE 4-continued

| | |
|---|---|
| Int | InitiatorUserID |
| Int | MediaTypeID |
| Long | RecordingRequestID |

If no recording operation is required, no particular operation is performed, though some bookkeeping or other non-operative actions may be done.

Upon receiving CTI event from the secondary CTI in parallel to the CTI event of the primary CTI, though possibly before or after some time relative to the primary CTI or primary controller, based on the event and/or data thereof operations of set 320 with respect to a secondary controller begin.

In operation 308 interaction data are constructed, such as common metadata construct.

In operation 312 the interaction data of the secondary controller is checked, whether the interaction data corresponds or is equivalent to or matches the interaction data of the primary controller. The checking may use the UII, or, in some embodiments, the common metadata or suitable elements thereof. in some embodiments, the checking is based on stored interaction data of the primary controller.

If true, that is, the interaction data of the primary controller and the secondary controller are matched, in operation 314 the interaction data of the secondary controller is marked or flagged as 'mate', indicating that the interaction data of the secondary controller corresponds with the interaction data of the primary controller; that is, both interactions of the primary controller and the secondary controller relate to recording of the same call. Optionally or additionally, the interaction data of the secondary controller is updated with data provided in the feedback from the recorder so that the interaction data of the secondary controller shares or matches, at least partly, the interaction data of the primary controller.

If false, that is, the interaction data of the secondary controller does not match interaction of the primary controller, in operation 316 the interaction data of the secondary controller is marked or flagged as 'non-mate', meaning an interaction that had been created or constructed as a result of CTI event where the interaction did not match any interaction data such as stored data and/or recoding event or feedback from the recorder. The 'non-mate' interaction generally lacks some of the information held by the primary controller for the call.

A 'non-mate' interaction may be consequently be set as 'mate' once a corresponding or equivalent interaction or recording-metadata (exemplified below) is found as the operations are carried out repeatedly as described above. For example, when responsive to a feedback from the recorder and/or other mechanisms such as periodic polling, a corresponding interaction of the primary controller is found, such as in a shared or mutual storage, for instance a database Consequently, in some embodiments, the interaction data of the secondary controller is updated with information of the primary controller thereby sharing or matching, at least partially, the interaction data of the primary controller.

In some embodiments, in order for the recorder to provide feedback on the course or progress of the recording, the recorder is provided (subscribed) with information, such as a data structure, that enables the recorder to notify and/or provide the feedback, such as a call-back function. The information is supplied to the recorder from all the controllers so that the recorder can provide the feedback to the corresponding controller (a subscriber controller) for the interaction of the primary controller.

In some embodiments, the information is supplied (subscribed) to the recorder responsive to CTI events or construction of an interaction responsive to CTI events. In some embodiments, the primary controller subscribes to the recorder before or after starting a recording.

Exemplary non-limiting structure for subscribing to the recorder is illustrated in Table-5 below, where the elements are structured based on the C programming language.

TABLE 5

| Long   | ControllerID    |
|--------|-----------------|
| String | URL             |
| Long   | RequeiredEvents |
| Event  | CallBackFunction |

In some embodiments, the feedback from the recorder to the controllers (the subscriber controllers) is provided with data, also referred to as a recording-metadata.

Exemplary non-limiting structure of a recorder recording-metadata feedback is illustrated in Table-6 below, where the elements are structured based on the C programming language.

TABLE 6

| Int      | RecorderID         |
|----------|--------------------|
| Long     | SessionID          |
| Long     | InteractionID      |
| Long     | CompoundID         |
| String   | UII                |
| Int      | ParticipantID      |
| DateTime | StartTime          |
| DateTime | StopTime           |
| Long     | TimeDiff           |
| Int      | InitiatorTypeID    |
| Int      | InitiatorUserID    |
| Int      | MediaTypeID        |
| Int      | RecordingSideTypeID |
| Long     | RecordingRequestID |
| Int      | ErrorResponseCode  |

It noted that in the elements in the tables above (Table-1 to Table-6) are assumed to be self-descriptive for a person skilled in the art, and for brevity are not elaborated upon.

FIG. 4 outlines operations related to the distribution of notifications from the recorder, according to exemplary embodiments of the disclosed subject matter.

In some embodiments, the notifications from the recorder are distributed or dispatched to the controllers by calling a call-back function provided by the controllers as part of subscribing to the recorder. Optionally or alternatively, the notifications from the recorder are distributed or dispatched to the controllers by other mechanism. For example, by triggering an event to which the controllers respond, such as interrupts.

Generally, the notification comprises and/or is accompanied with recording-metadata such as or similar to that of Table-6 as described above. For brevity, a notification and feedback are referred to interchangeably.

FIG. 4 is divided to three sets of operations, a set 410 with respect to the recorder, a set 420 with respect to the primary controller and a set 430 with respect to the secondary controller.

In operation 402, recorder of a call is started or initiated. In operation 404 a check is made whether the recording has started properly. If the recording is not started, at not least properly, such as due to malfunction or insufficient storage, the case is regarded as an error. In operation 406 the error is handled such as by notifying the active controller, that is, the primary controller, which, for example, takes corrective actions such as to allocate further or alternate memory.

In case the recording has started properly, in operation 408 a notification is dispatched to all the controllers, namely, the primary controller and the secondary controller, as illustrated schematically in an arrow 444.

In operation 412 the recorder notification has arrived at the primary controller.

Responsive to the notification, in operation 414 the primary controller locates the interaction respective to the 'InteractionID' as provided in the notification, and subsequently, in operation 416, updates the interaction data with elements from the feedback from the recorder, as, for example, provided in Table-6.

In operation 422 the recorder notification has arrived at the secondary controller.

Responsive to the notification, in operation 424 the secondary controller attempts to locate an interaction according to the UII as provided by in the notification. in operation 426 it is checked whether such an interaction is found. In case the interaction is found, in operation 432 the interaction is updated with data provided in the recorder feedback, and the interaction is marked or flagged as 'mate', indicating that the interaction data of the secondary controller corresponds with the interaction data of the primary controller.

Further, in operation 434, in order to match the interaction of the secondary controller with the corresponding interaction of the primary controller, one or more elements of the interaction data of the secondary controller are matched with that of the primary controller, for example, the 'compoundID' element.

In case in operation 426 the attempt to locate an interaction according to the UII as provided by in the notification has failed, namely, no interaction of the secondary controller corresponds with the interaction data of the primary controller was found, then in operation 436 the secondary controller creates an interaction based on data provided in the feedback from the recorder, and the created interaction is marked or flagged as 'non-mate', indicating that the primary controller is ahead of the secondary controller and/or the secondary controller does not yet keeps up with the primary controller.

It is noted that, in some embodiments, once the secondary controller is provided with metadata from the CTI for a 'non-mate' interaction, the interaction is updated and marked as 'mate'. The interaction is updated such as responsive to further notifications from the recorder (e.g. end of recording) and/or alternatively such as responsive to another event such as from a CTI or by polling storage mutual to primary controller and the secondary controller.

FIG. 5 exemplifies an outline 500 of operations for handling fault for fail-safe operation, according to exemplary embodiments of the disclosed subject matter, providing some elaboration with respect to outline 200.

Outline 500 is divided to two parallel sets of operations; a set 510 for a secondary controller upon failure of a primary controller, thereby switching to the role of a primary controller, referred to also as an 'alternative primary controller', and a set 520 for a secondary controller operating as a an alternative primary controller after the originally primary controller has failed or faulted.

It should be realized that, at least in some cases or embodiments, once a primary controller ceased to operate properly, the recorder may or does continue to record the audio from the PBX as was initiated by the primary controller before it faulted. In such cases or embodiments, the recorder is and/or may be still operating according to the recording-metadata and may send feedback and/or events, also to a possibly non-responsive primary controller. The activities of the recorder and/or that are related to the recording are considered as an interaction, where that interaction might be hanging or uncontrolled due the failure of the primary controller. Thus, in case of a faulty primary controller, those uncontrolled interactions have to be intercepted, that is, identified, and stopped.

It is noted again that in some embodiments, the recorder has recoding components respective to each controller so in case the recorder component respective to the primary controller is stopped, essentially and/or effectively the recorder component respective to the secondary controller keeps on the activities or interaction thereof.

In operation 502 it is checked whether the primary controller has failed. For example, by checking responsive to a CTI event received at the secondary controller whether the primary controller stored information, such as interaction data, in a storage shared or accessible to both controllers.

If the primary controller has failed, in operation 504 all the interactions that are marked as 'non-mate', that is, interaction data that do not correspond to the interactions data of the primary controller, are located. In other words, loose of uncontrolled interactions as described above are located.

In operation 506 it is checked whether a 'non-mate' interaction has or corresponds to an ongoing recording, such as based on feedback received at the secondary controller from the recorder. If true, in operation 508 the interaction is closed, such as to cancel subscription of the primary controller in the recorder so that no feedback is sent for the primary controller, and in operation 512 the recording is stopped. In some embodiments, such as described above, a component of the recorder that was controlled by the original primary controller is stopped.

If false, that is no ongoing recording is found, in operation 514 the recording according to the interaction data is started. In some embodiments, such as described above, a component of the recorder that corresponds with the secondary controller is started. Consequently, the secondary controller operates in the role of the primary controller, that is, as an alternative primary controller. For example, the secondary controller controls the component of the recorder that corresponds to the secondary controller, and updates the interaction data according to the course of the recording as provided by the recorder.

Upon a notification or event of an end of interaction that was previously initiated by the original primary controller, such as end or recording notification from the recorder of a call event from the secondary CTI, in operation 522 the alternative primary controller checks whether interaction thereof can be identified with interaction of the originally primary controller, for example, by an element of interaction data as the interaction ID (e.g. 'InteractionID' in Table-4 and Table-6). If true, control is moved to operation 528 described below. If false, in operation 524 the interaction is further checked for identification of the interaction of the secondary controller with that of the originally primary controller according to the UII, using, for example, the interaction data stored in a database. If true, control is moved to operation 528 described below. If the interaction is not identified by the UII, the condition is regarded as an error and handled in operation 526, such as by reporting and/or initiating an event for possible further handling.

If the interaction is identified, in operation 528 the alternative primary controller proceeds with activities of a primary controller, where, in some embodiments, controls the component of the recorder that corresponds to the secondary controller.

In some embodiments, the operations with respect to FIG. 4 may be varied. For example, operation 522 and operation 524 may be combined to use the UII to identify and locate an interaction.

FIG. 6 exemplified an outline 600 operations for using a unique interaction identifier (UII) in a controller, according to exemplary embodiments of the disclosed subject matter.

Outline 600 is divided to three sets of operations, a set 610 for operations upon a CTI even, a set 620 for operations in extracting the UII responsive to a feedback from the recorder, and a set 630 of operations upon a fault in a primary controller.

Generally, the operations of set 610 apply to all the controllers.

Upon a CTI event received at a controller the operations of set 610 begin.

In operation 602, responsive to a CTI event and/or data thereof, the CTI and/or integration properties of the CTI, such as elements of metadata thereof, are checked.

In operation 604 the context of a call is checked, such as incoming call, conference call, a call transfer and the like.

In operation 606, based at least partly on the CTI and/or integration properties thereof and/or at least partly on the call context, common metadata is constructed such as described above.

In operation 608, based on the common metadata, a UII is generated and/or formed.

Generally, subsequently, all the controllers subscribe to the recorder by providing data as or similar to Table-5 as described above, including also a mechanism for feedback to the controllers such as a call-back function or pointer.

The primary controller initiates recordings and provides the recorder with data such as or similar to Table-4 as describe above, where the data comprises also the UII as determined by the primary controller. Optionally or additionally, the primary controller updates interaction data thereof with elements regarding the recording, such as start time.

After a recording has started, operations of set 620 for feedback handling can be invoked.

Upon a controller receiving a feedback from the recorder the operations of set 620 begin. Operations of set 620 relate, without limiting or otherwise specified, to a secondary controller.

In operation 612, the secondary controller obtains a UII of an interaction from the feedback data of the recorder. For example, the UII as provided or assigned by the primary controller to the recorder is fed back to the secondary controller in a data structure as or similar to Table-6 as described above.

It is noted that since all the controllers use the same common metadata for an interaction, so is the UII common to each interaction in al the controllers.

In operation 614, based on the UII obtained in the feedback data, the secondary controller locates, or attempts to locate, the interaction as represented by the interaction data.

In operation 616, the interaction data of the located interaction is updated. For example, the interaction data of the secondary controller is updated by metadata elements of the primary controller as supplied by the primary controller to the recorder, thereby the primary controller and the secondary controller share, at least partially, the same metadata elements for the located interaction. For example, at least partially the data elements included in Table-3.

The located interaction is marked or flagged as 'mate', indicating that the interaction data of the secondary controller corresponds with the interaction data of the primary controller, that is, both interactions of the primary controller and the secondary controller relate to the same call, as, for example, an element of Table-3 above.

However, operation 614 the attempt to locate an interaction according to the UII as provided by the feedback from the recorder may fail. For example, due to timing or processing times the secondary controller lags somewhat in constructing the interaction relative to the primary controller and/or feedback from the recorder. In such a case, the secondary controller constructs a new interaction based on the data provided in the feedback from the recorder and marks or flags the new interaction as 'non-mate', indicating a case where, for example, the primary controller is ahead of the secondary controller and/or the secondary controller does not yet keeps up with the primary controller.

Subsequently, when a CTI and data arrives at the secondary controller having a UII that matches the UII of a 'non-mate' interaction constructed before, the 'non-mate' interaction that now corresponds with the interaction data of the primary controller is marked or flagged as 'mate', and updated to share, at least partially, the same metadata elements with metadata of the primary controller as matched by the UII.

Responsive to a faulty primary controller, the operations of set 630 begin. Operations of set 630 relate to a secondary controller.

In operation 622, the pending or active interactions are located by a UII.

In operation 624, recordings according to the pending interactions are maintained or controlled.

It is noted that, as described with respect to FIG. 5, only 'mate' interactions are pending where 'non-mate' interactions, that is interactions that do correspond to interactions of the faulty primary controller, have been closed.

It is noted that, in some embodiments, interaction data that represent or stand for interactions are stored, such as in a database on storage 140 and/or in a storage integrated and/or linked with the controllers.

Thus, in some embodiments, locating an interaction implies searching and/or identifying interaction data in the storage, such as by a UII. The located interactions as the interaction data is retrieved and/or worked upon in when updated, and the in case the data is retrieved from the storage, the modified data is stored back.

In some embodiments, the methods described above may be varied. For example, the controllers have a communication therebetween and/or a shared storage by which the primary controller sends and/or shares an interaction with the secondary controller, optionally using a UII for identification. As another example, a CTI is connected to a plurality of controllers for redundant CTI events and data thereof so a secondary controller may operate with interaction data as of the primary controller without having to match interaction data therebetween.

There is thus provided according to the present disclosure a method for fault-tolerant recording of calls of a PBX, comprising:

concurrently receiving metadata of calls of a PBX by a plurality of computerized apparatuses;

based on the metadata, generating by the plurality of computerized apparatuses unique identifiers for each of the calls such the unique identifiers that are common between the plurality of the computerized apparatuses;

activating a first computerized apparatus of the plurality of computerized apparatuses to control recordings of contents of the calls based on the metadata received by the first computerized apparatus while assigning the recording with the unique identifiers respective to the calls;

operating the plurality of the computerized apparatuses to receive feedbacks of activities of the recordings, where the feedbacks comprise the assigned unique identifiers respective to the calls so that the plurality of the computerized apparatuses are updated with activities of recordings of identifiable calls; and in case of a failure of the first computerized apparatus, activating a second computerized apparatus of the plurality of computerized apparatuses to maintain, according to the unique identifiers comprised in the feedbacks of activities of the recording, the recordings that were controlled by the first computerized apparatus, thereby sustaining the recordings regardless of the failure of the first computerized apparatus.

In some embodiments, receiving metadata of the calls comprises receiving the metadata from a plurality of CTI apparatuses connected to and intercommunicating with the PBX, each CTI apparatus of the plurality of the CTI apparatuses connected to one of the computerized apparatus of the plurality of the computerized apparatuses at least in a one-to-one fashion.

In some embodiments, at least a part the metadata received from the plurality of the CTI apparatuses is formed by the plurality of the computerized apparatuses in equivalent contents therebetween, regardless of possible differences in the metadata as received from the plurality of the CTI apparatuses.

In some embodiments, in case the recordings are carried out by a plurality of recording components, responsive to the failure of the first computerized apparatus further comprising discarding by the second computerized apparatus recordings that were formerly controlled by the first computerized apparatus.

There is thus further provided according to the present disclosure a system for fault-tolerant recording of calls of a PBX, comprising:

a PBX;

a plurality of CTI apparatuses connected to the PBX for supplying metadata of calls of the PBX;

a plurality of computerized apparatuses corresponding to the plurality of the CTI apparatuses where each of the computerized apparatuses is connected to one of the CTI apparatuses for receiving the metadata of the calls and configured to generate unique identifiers of the calls that are common between the plurality of the computerized apparatuses;

a recorder device connected to the PBX by a data link for receiving contents of the calls, and further connected to the plurality of the computerized apparatuses;

the system configured such that when the contents of the calls of the PBX is transferred to the recorder device, correspondingly the plurality of the CTI apparatuses supply metadata of the calls to the plurality of the plurality of the computerized apparatuses connected thereto, and the system is further configured such that a first computerized apparatus of the plurality of the computerized apparatuses controls recording of the contents of the calls by the recorder device while assigning the unique identifiers of the calls to the recorder device, wherein the recorder device is configured to provide feedback of activities thereof to the plurality of the computerized apparatuses, wherein the feedback comprises the assigned unique identifiers of the calls, and in case the first computerized apparatus of the plurality of the computerized apparatuses fails, a second computerized apparatus of the plurality of the computerized apparatuses is activable to maintain, based on the supplied metadata and the feedback from the recorder device that comprises the assigned unique identifiers of the calls, recordings of the calls that were controlled by the first computerized apparatus, thereby sustaining recordings of the recorder device regardless of a failure of the first computerized apparatus.

In some embodiments, the system further comprises a data storage for at least one or both of sharing metadata of the plurality of the computerized apparatuses, or for storing the contents of the calls.

In the context of some embodiments of the present disclosure, by way of example and without limiting, terms such as 'operating' or 'executing' imply also capabilities, such as 'operable' or 'executable', respectively.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in a different order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for fault-tolerant recording of calls, comprising:

concurrently receiving by a plurality of computerized apparatuses via a plurality of different communication integration devices each of which correspondingly connected to each one of the computerized apparatuses, metadata of a plurality of calls that are conducted concurrently at a telephonic exchange equipment that is connected to the communication integration devices, each of the metadata corresponding to each call of the calls and differently structured according to the different communication integration devices;

based on a plurality of elements of the differently structured metadata, generating by the plurality of the computerized apparatuses unique identifiers for each call of the calls such that the unique identifiers are commonly structured therebetween;

activating a first computerized apparatus of the plurality of computerized apparatuses to control recordings by controlling the operation of a recorder device configured to provide feedback of activities thereof to the plurality of computerized apparatuses of contents of the calls based on the metadata received by the first computerized apparatus while assigning the recording with the unique identifiers respective to the calls;

operating the plurality of the computerized apparatuses to receive feedbacks of activities of the recordings, where the feedbacks comprise the assigned unique identifiers respective to the calls so that the plurality of the computerized apparatuses are updated with activities of recordings of identifiable calls; and in case of a failure of the first computerized apparatus, activating a second computerized apparatus of the plurality of computerized apparatuses to maintain, according to the unique identifiers comprised in the feedbacks of activities of the recording, the recordings that were controlled by the first computerized apparatus, thereby sustaining the recordings regardless of the failure of the first computerized apparatus.

2. The method according to claim 1, wherein receiving metadata of the calls comprises receiving the metadata from the plurality of communication integration devices connected to and intercommunicating with the telephonic exchange equipment, each communication integration device of the plurality of the communication integration devices connected to one of the computerized apparatus of the plurality of the computerized apparatuses at least in a one-to-one fashion.

3. The method according to claim 2, wherein at least a part the metadata received from the plurality of the communication integration devices is formed by the plurality of the computerized apparatuses with equivalent contents therebetween, regardless of the differences in the metadata as received from the plurality of the communication integration devices.

4. The method according to claim 1, wherein the recordings are carried out by an at least one recording device, and responsive to the failure of the first computerized apparatus further comprising discarding by the second computerized apparatus recordings that were formerly after the failure controlled by the first computerized apparatus.

5. A system for fault-tolerant recording of a plurality of calls conducted concurrently at a telephonic exchange equipment, comprising:
a telephonic exchange equipment;
a plurality of communication integration devices connected to the telephonic exchange equipment for supplying metadata of calls of the telephonic exchange equipment;
a plurality of computerized apparatuses corresponding to the plurality of the communication integration devices where each of the computerized apparatuses is connected to one of the communication integration device for receiving the metadata of the calls and configured to generate unique identifiers of the calls that are commonly structured between the plurality of the computerized apparatuses regardless of the differences in the metadata supplied by the plurality of communication integration devices;
a recorder device connected to the telephonic exchange equipment by a data link for receiving contents of the calls, and further connected to the plurality of the computerized apparatuses;
the system configured such that when the contents of the calls of the telephonic exchange equipment is transferred to the recorder device, correspondingly the plurality of the communication integration devices supply metadata of the calls to the plurality of the computerized apparatuses connected thereto, and the system is further configured such that a first computerized apparatus of the plurality of the computerized apparatuses controls recording of the contents of the calls by the recorder device while assigning the unique identifiers of the calls to the recorder device, wherein the recorder device is configured to provide feedback of activities thereof to the plurality of the computerized apparatuses, and wherein the feedback comprises the assigned unique identifiers of the calls, and in case the first computerized apparatus of the plurality of the computerized apparatuses fails, a second computerized apparatus of the plurality of the computerized apparatuses is activable to maintain, based on the supplied metadata and the feedback from the recorder device that comprises the assigned unique identifiers of the calls, recordings of the calls that were controlled by the first computerized apparatus, thereby sustaining recordings of the recorder device regardless of a failure of the first computerized apparatus.

6. The system according to claim 5, further comprising a data storage for at least one or both of sharing metadata of the plurality of the computerized apparatuses, or for storing the contents of the calls.

7. The system according to claim 5, wherein at least one of the plurality of the communication integration devices is different relative to other ones of the plurality of the communication integration devices, and correspondingly provides metadata that is differently structured relative to the structure of the metadata provided by the ones of the plurality of the communication integration devices.

8. The method according to claim 1, wherein the telephonic device comprises a private branch exchange (PBX) device.

9. The method according to claim 1, wherein the metadata provided to the first computerized apparatus is different from the metadata provided to the second computerized apparatus.

10. The method according to claim 1, wherein the communication integration device comprises a computer telephony integration (CTI) device.

11. The system according to claim 5, wherein the telephonic device comprises a private branch exchange (PBX) device.

12. The system according to claim 5, wherein the metadata provided to the first computerized apparatus is different from the metadata provided to the second computerized apparatus.

13. The system according to claim 5 wherein the communication integration device comprises a computer telephony integration (CTI) device.

* * * * *